Aug. 24, 1965 H. J. KUNZKE 3,202,841

SWITCHING NETWORK

Filed April 1, 1963

INVENTOR.
HANS J. KUNZKE

BY

ATTORNEY

United States Patent Office 3,202,841
Patented Aug. 24, 1965

3,202,841

SWITCHING NETWORK

Hans J. Kunzke, Glendora, Calif., assignor to Clary Corporation, San Gabriel, Calif., a corporation of California Filed Apr. 1, 1963, Ser. No. 269,324
1 Claim. (Cl. 307—88.5)

This invention relates to electrical switching networks and has particular reference to networks containing a plurality of bistable electric switches, i.e. flip-flops, with means for enforcing proper operation of such switches.

In electronic computing and similar equipment, it is often desirable to arrange a plurality of flip-flops so that any one may be set but such one must be reset before any other flip-flops in the circuit may be set. One example of such a switching network is found in programming apparatus for electronic computers wherein provision is made to skip one or more of various program steps under control of different flip-flops and wherein it is required that only one flip-flop be in control at any one time, even though set and reset signals may be received at any time by any of the control flip-flops.

It therefore becomes a principal object of the present invention to provide a network of bistable devices wherein setting of anyone device will prevent setting of any other until such one is reset.

The manner in which the above and other objects of the invention are accomplished will be readily understood on reference to the following specification when read in conjunction with the accompanying drawings, wherein.

Figure 1:
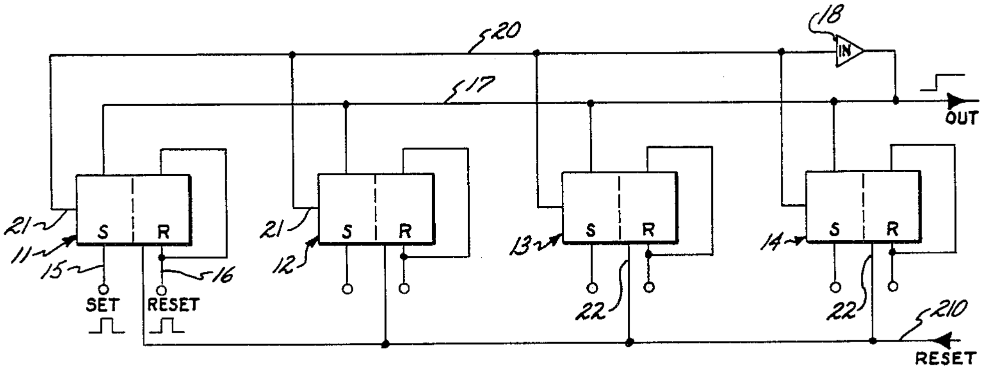
FIG. 1 is a block diagram of a switching network of flip-flops embodying a preferred form of the present invention.

Referring to the drawings, four flip-flop units 11, 12, 13 and 14 are shown. However, this number may be expanded or contracted to any desired extent as will be obvious from the following description.

Each flip-flop is provided with a "set" input 15 effective when energized by a suitable pulse to set the flip-flop in set condition, and a "reset" input 16 effective when energized to set the flip-flop in a reset condition.

When in set condition, each flip-flop produces a steady state, relatively high control voltage over a control bus 17, common to all flip-flops. Such high voltage is transmitted to a suitable exterior device (not shown) to be controlled and is also transmitted through an inverting amplifier 18 and bus 20 to blocking inputs 21 of the various flip-flops, thereby blocking setting of the latter, although it has no effect on a particular flip-flop which is currently in set condition.

In addition to individually resetting the different flip-flops by applying a "reset" pulse to the reset input 16 thereof, any set flip-flop may be reset by applying a "reset" pulse to a reset bus 210 connected to reset inputs 22 of the various flip-flops.

Figure 2:
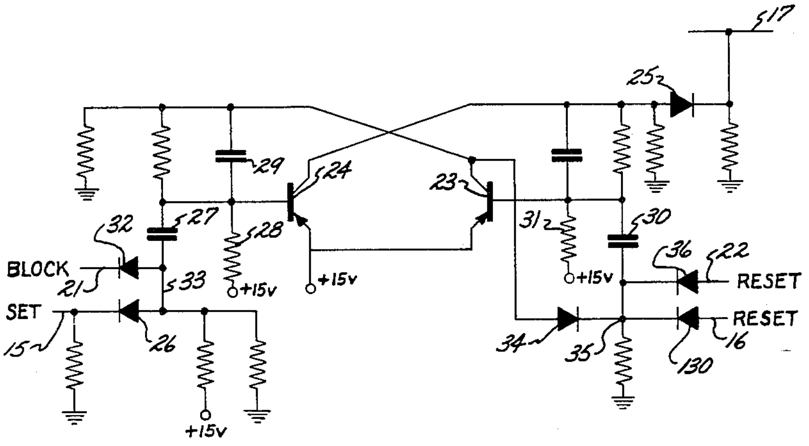
FIG. 2 is a detailed schematic view illustrating one of the flip-flop circuits.

Referring to FIG. 2, each flip-flop circuit comprises a pair of PNP transistors 23 and 24. In normal reset condition, transistor 23 is conductive and transistor 24 is non-conductive. The collector of transistor 24 is connected through a diode 25 to the control signal bus 17 which is therefore normally held low.

In order to set the flip-flop circuit, a positive "set" pulse is applied to the input 15 and its trailing edge is transmitted through a diode 26 and differentiated by capacitor 27 and resistor 28. The resulting negative going spike is transmitted to the base of transistor 24, thereby causing the latter to conduct. The collector of this transistor will therefore transmit a positive steady state voltage of approximately 15 volts to the control bus 17. Simultaneously, the trailing edge of the "set" pulse will be transferred over the capacitor 29 to the collector of transistor 23, thereby rendering the latter nonconductive.

In order to reset the flip-flop circuit through the individual reset input 16, a positive "reset" pulse is applied to the latter. Such pulse is transmitted through diode 130 and its trailing edge is differentiated by capacitor 30 and resistor 31 and fed to the base of transistor 23, thereby causing the same to conduct and returning the flip-flop circuit to its reset condition.

It will be recalled that the control signal applied over bus 17 is inverted and fed over line 20 to the inputs 21 of the different flip-flop circuits. Thus, in those flip-flops which are in reset condition, the input 21 will through diode 32 hold line 33 at the low level (substantially ground) to prevent setting of the flip-flop by any incoming "set" pulses over input 15. This, of course, will have no effect on a particular flip-flop which is currently in set condition.

In order to prevent "reset" pulses applied to different flip-flops which are already in reset condition from pulling down the level of a control or high state signal on the control bus 17, a blocking diode 34 is connected between a juncture point 35 connected to the reset inputs and the collector of transistor 23 to hold such point at the level of the latter collector as long as the transistor is in its reset condition.

The input 22 from the reset bus 210 is connected through diode 36 to a point intermediate point 35 and capacitor 30 to effect a reset operation in the same manner as an individual "reset" pulse applied to input 16.

Although the invention has been described in detail and certain specific terms and languages have been used, it is to be understood that the present disclosure is illustrative rather than restrictive and that changes and modifications may be made without departing from the spirit or scope of the invention as set forth in the claim appended hereto.

Having thus described the invention, what is desired to be secured by United States Letters Patent is:

A switching network comprising a plurality of flip-flops, each having a set state and a reset state, each flip-flop also including a set input circuit for applying a set pulse to cause said flip-flop to change from a reset state to a set state; each of said flip-flops being effective to produce an output signal when in a said set state, means responsive to a said output signal from any of said flip-flops for causing all of said input circuits to inhibit a said set pulse when said output signal is being produced, each of said flip-flops also including a reset input circuit for applying a reset pulse to cause the respective said flip-flop when in a said set state to change to a said reset state; reset means for applying a reset pulse in common to all of said reset input circuits, and means for inhibiting a said reset pulse from affecting the circuit conditions of any of said flip-flops which are in said reset condition.

References Cited by the Examiner

UNITED STATES PATENTS

| | | | |
|---|---|---|---|
| 2,299,229 | 10/42 | Hall | 315—325 |
| 2,315,958 | 4/43 | Hill et al. | 328—88 |
| 2,594,389 | 4/52 | Bruce | 315—325 |
| 2,629,020 | 2/53 | Robertson | 315—325 |
| 3,051,855 | 8/62 | Lee | 328—43 |

DAVID J. GALVIN, *Primary Examiner.*